United States Patent
Wieneke et al.

(10) Patent No.: US 9,733,267 B2
(45) Date of Patent: Aug. 15, 2017

(54) METHOD OF DETERMINING A CHANGING SPATIAL DISTRIBUTION OF PARTICLES AT MULTIPLE POINTS IN TIME

(71) Applicant: LaVision GmbH, Goettingen (DE)

(72) Inventors: Bernhard Wieneke, Goettingen (DE); Andreas Schroeder, Goettingen (DE); Daniel Schanz, Goettingen (DE)

(73) Assignee: LAVISION GMBH, Goettingen (DE)

( * ) Notice: Subject to any disclaimer, the term of this patent is extended or adjusted under 35 U.S.C. 154(b) by 25 days.

(21) Appl. No.: 14/953,675

(22) Filed: Nov. 30, 2015

(65) Prior Publication Data
US 2016/0084868 A1    Mar. 24, 2016

Related U.S. Application Data

(63) Continuation-in-part of application No. PCT/EP2014/061062, filed on May 28, 2014.

(30) Foreign Application Priority Data

May 31, 2013 (DE) .......................... 10 2013 105 648

(51) Int. Cl.
*G06K 9/00* (2006.01)
*G01P 5/20* (2006.01)
(Continued)

(52) U.S. Cl.
CPC ............... *G01P 5/20* (2013.01); *G01P 5/001* (2013.01); *G06T 7/246* (2017.01); *G06T 2207/30241* (2013.01)

(58) Field of Classification Search
None
See application file for complete search history.

(56) References Cited

U.S. PATENT DOCUMENTS 7,697,720 B2 *  4/2010  Low .................... G01S 3/781
                                                             382/103
8,542,882 B2    9/2013  Wieneke
(Continued)

FOREIGN PATENT DOCUMENTS

DE  10 2009 009 551 B4   2/2013
EP        2 344 894 A1   8/2010
WO     2010/094370 A1    8/2010

OTHER PUBLICATIONS

PCT Search Report in co-pending related PCT Application No. PCT/EP2014/061062, mailed Dec. 17, 2015.
(Continued)

*Primary Examiner* — Avinash Yentrapati
(74) *Attorney, Agent, or Firm* — Thomas | Horstemeyer, LLP

(57) ABSTRACT

For determining a changing spatial distribution of particles at each of multiple points in time, real two-dimensional images of the particles are recorded with different mapping functions. An estimated spatial distribution of the particles is provided. Virtual two-dimensional images of the estimated spatial distribution are calculated applying the different mapping functions. Differences between the virtual and the real two-dimensional images are determined; and the estimated spatial distribution of the particles are varied for reducing the differences to obtain a spatial distribution approximated to the actual spatial distribution of the particles. The estimated spatial distribution of the particles is provided in that the locations of the individual particles in a spatial distribution approximated for one other point in time are shifted dependently on how the locations of the individual particles have changed between at least two spatial distributions approximated for at least two other points in time.

22 Claims, 3 Drawing Sheets

(51) Int. Cl.
*G01P 5/00* (2006.01)
*G06T 7/246* (2017.01)

(56) References Cited

U.S. PATENT DOCUMENTS

| | | | | |
|---|---|---|---|---|
| 2008/0312010 | A1* | 12/2008 | Marty | A63B 24/0003 |
| | | | | 473/447 |
| 2011/0287948 | A1* | 11/2011 | Suresh | B01L 3/502746 |
| | | | | 506/7 |
| 2011/0299738 | A1* | 12/2011 | Wieneke | G01P 5/001 |
| | | | | 382/107 |
| 2014/0002617 | A1* | 1/2014 | Zhang | H04N 13/0242 |
| | | | | 348/48 |
| 2014/0379176 | A1* | 12/2014 | Ross | B64G 1/24 |
| | | | | 701/3 |
| 2015/0346076 | A1* | 12/2015 | Stramski | G01N 15/1434 |
| | | | | 356/336 |

OTHER PUBLICATIONS

J. Willneff (2003): A Spatio-Temporal Matching Algorithm for 3D Particle Tracking Velocimetry, Zürich, Diss. ETH No. 15276.

Hering F. et al.: "Particle tracking velocimetry beneath water waves. .Part 1: visualization and tracking algorithms", Experiments in Fluids, Springer, Heidelberg, DE, vol. 23, No. 6, Dec. 1, 1997, pp. 472-482.

Ruhnau P. et al: "A variational approach for particle tracking velocimetry", Measurement Science and Technology, IOP, Bristol, GB, vol. 16, No. 7, Jul. 1, 2005, pp. 1449-1458.

\* cited by examiner

METHOD OF DETERMINING A CHANGING SPATIAL DISTRIBUTION OF PARTICLES AT MULTIPLE POINTS IN TIME

CROSS REFERENCE TO RELATED APPLICATIONS

This application is a continuation in part to International Application PCT/EP2014/061062 filed on May 28, 2014, entitled "Verfahren zur Ermittlung einer sich ändernden räumlichen Verteilung von Partikeln zu mehreren Zeitpunkten" and claiming priority to German Patent Application No. DE 10 2013 105 648.2 filed on May 31, 2013 and entitled "Verfahren zur Ermittlung einer sich ändernden räumlichen Verteilung von Partikeln zu mehreren Zeitpunkten".

FIELD

The present invention relates to a method of determining a changing spatial distribution of particles at multiple points in time following to each other at intervals.

The determination of the distribution of the particles at the different points in time may particularly serve the purpose of quantitatively registering flows of a fluid which is seeded with the particles. Thus, velocity fields of the flows of interest may be reconstructed. This procedure is known as Particle Tracking Velocimetry (PTV).

The particles whose changing spatial distribution is determined, besides physical particles, may also be other physical objects which can be imaged due to their optical properties, like for example edges, density variations, maxima of light intensity distributions and so on.

BACKGROUND OF THE INVENTION

German Patent DE 10 2009 009 551 B4 (corresponding to U.S. Pat. No. 8,542,882 B2) discloses a method of determining flow conditions in a measurement volume through which a fluid seeded with optically detectable particles flows. According to this known method, at each of several points in time, a plurality of real two-dimensional images of a real three-dimensional distribution of the particles are recorded by means of a fixed plurality of spatially offset image sensors. A perspective mapping function is determined for each image sensor, which defines where a particle with a particular three-dimensional or spatial position in the measurement volume is imaged onto each image sensor. Further, for each point in time, an estimated spatial distribution is provided. Starting from this estimated spatial distribution, the real spatial distribution is iteratively determined up to a desired accuracy. For this purpose, virtual two-dimensional images of the estimated distribution are calculated using the mapping functions. Differences between the virtual images and the associated real images are determined by comparison; and the estimated distribution is varied depending on the differences determined. Particularly, the estimated distribution is varied with regard to the location of the individual particles. Each variation of the estimated distribution may be subject to a plausibility check assuming that only particles at the border of the measurement volume may disappear.

DE 10 2009 009 551 B4 states that the particular origin of the provided estimated spatial distribution from which the method starts is not relevant. For example, the provided estimated spatial distribution of the particles may be a theoretically calculated distribution of an estimated number of particles, and the estimated number of particles may result from a particle density known from the measurement conditions. In practice, however, such a provided distribution of particles proves to be unsuitable to purposefully get to the real spatial distribution at the desired accuracy. Thus, in the practical application of the method known from DE 10 2009 009 551 B4, other estimation mechanism are applied which are based on three-dimensional reconstructions of the spatial distribution from the real two-dimensional images recorded at the respective point in time. Particularly, the result of a preliminary determination of the spatial locations of individual particles based on their positions in the real images by means of triangulation may be used for providing the estimated spatial distribution. Executing the triangulation for each point in time takes long computing time in addition to the computing time for the iteration steps to get from the estimated spatial distribution to the real spatial distribution. Further, the maximum particle density is limited due to application limits of the triangulation.

For relocating particles which have already been imaged at a prior point in time within images recorded at a later point in time J. Willneff (2003): A Spatio-Temporal Matching Algorithm for 3D Particle Tracking Velocimetry, Zürich, Diss. ETH No. 15276, teach to extrapolate the locations of the particles at the later point in time based on their prior locations, and to calculate their expected positions in the real images recorded at the later point in time based on their extrapolated locations and considering the mapping functions. For determining the spatial distributions of the particles at the various points in time, however, the locations of the particles are three-dimensionally reconstructed from the real two-dimensional images in a conventional way.

There still is a need of a method for determining a changing spatial distribution of particles at multiple points in time following to each other at intervals which allows for an accurate determination of the actual spatial distribution of the particles at the respective desired accuracy at a particularly short computing time.

SUMMARY OF THE INVENTION

The present invention relates to a method of determining a changing spatial distribution of particles at multiple points in time following to each other at intervals. For each of the points in time, the method comprises the following steps: (i) recording real two-dimensional images of the particles with different mapping functions at the respective one of the points in time; (ii) providing an estimated spatial distribution of the particles; (iii) calculating virtual two-dimensional images of the estimated spatial distribution applying the different mapping functions; (iv) determining differences between the virtual two-dimensional images and the real two-dimensional images of the same mapping functions; and (v) varying the estimated spatial distribution of the particles for reducing the differences to obtain an approximated spatial distribution which is approximated to the actual spatial distribution of the particles at the respective one of the points in time. For at least one of the points in time, the estimated spatial distribution of the particles is provided in that the locations of the individual particles in an approximated spatial distribution obtained for one other of the points in time are shifted dependently on how the locations of the individual particles have changed between at least two approximated spatial distributions obtained for at least two others of the points in time.

Other features and advantages of the present invention will become apparent to one with skill in the art upon examination of the following drawings and the detailed description. It is intended that all such additional features and advantages be included herein within the scope of the present invention, as defined by the claims.

SHORT DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
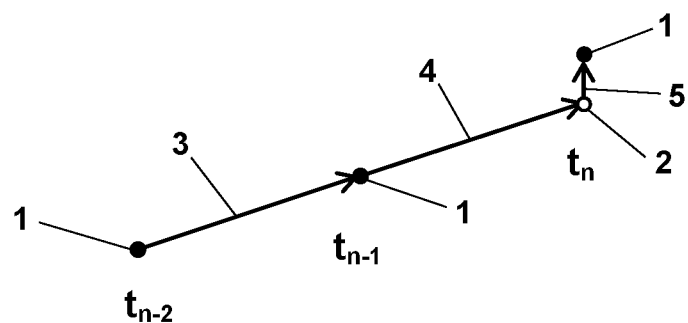
FIG. 1 illustrates the method according to the invention by means of a first embodiment example.

According to the invention, a method of determining a changing spatial distribution of particles at a plurality of points in time following to each other at intervals comprises the following steps for each point in time: (i) recording real two-dimensional images of the particles with different effective mapping functions at the respective point in time; (ii) providing an estimated spatial distribution of the particles; (iii) calculating virtual two-dimensional images of the estimated spatial distribution applying the different mapping functions; (iv) for each of the mapping functions, determining differences between the respective virtual two-dimensional image and the respective real two-dimensional image; and (v) varying the estimated spatial distribution of the particles for reducing the differences to obtain an approximated spatial distribution approximated to the actual spatial distribution of the particles at the respective point in time. For at least one point in time, the estimated spatial distribution of the particles is provided in that the spatial positions or locations of the individual particles in an approximated spatial distribution obtained for one other point in time are shifted dependently on how their locations have changed between approximated spatial distributions obtained for at least two other points in time.

With regard to this combination of features of the method according to the invention, the following notes are indicated. The fact that the steps (i) to (v) are executed for each of several points in time following to each other at intervals does not exclude that, with regard to further points in time at which no approximated spatial distributions are available, the estimated spatial distribution of the particles may be provided in another way, like for example based on evaluating the different real images by means of triangulation. This particularly applies to prior points in time at which no approximated spatial distribution are available for even prior points in time.

The different effective image transfer functions or mapping functions at which the real two-dimensional images of the particles are recorded at the respective point in time should remain unchanged over the multiple points in time, or occurring variations of the mapping functions have to be compensated. The different mapping functions particularly include different imaging directions or mapping directions. At least, two different mapping functions with different mapping directions are applied. A number of cameras used for recording the images of the particles and, thus, the number of different mapping directions may, however, be even clearly higher than two.

Both determining the differences between the virtual and real two-dimensional images of the same mapping functions and varying the estimated spatial distribution of the particles for reducing the differences may particularly relate to the positions of the particles in the two-dimensional images and the locations of the particles in the spatial distribution. Generally, however, other parameters as described in DE 10 2009 009 551 B4, corresponding to U.S. Pat. No. 8,542,882 B2 which is incorporated herein by reference, may also be considered here.

In the method according to the invention, the steps (iii) to (v) may be iteratively repeated two or more times to adapt the approximated spatial distribution step by step to the actual spatial distribution until, for example, a preset maximum error or limit value with regard to the differences of the positions of the individual particles in the real and virtual two-dimensional images is no longer exceeded. Also in this regard, further details of the method according to the present invention may be taken from DE 10 2009 009 551 B4, corresponding to US patent U.S. Pat. No. 8,542,882 B2 incorporated herein by reference.

The spatial distributions approximated for the one point in time of the other points in time and the at least two points in time of the other points in time may be spatial distributions approximated for points in time preceding or succeeding the at least one point in time. This applies, even if in the following only preceding or prior points in time are mentioned. All the following statements are to be understood as correspondingly also applying to succeeding or later points in time following to the at least one point in time for which the actual spatial distribution of the particles is approximated. Often, the spatial distributions approximated for the one other point in time and the at least two other points in time, which are considered in providing the estimated spatial distribution for the at least one point in time, are, however, either all obtained for prior points in time or all obtained for later points in time.

In the method according to the present invention, locations of the individual particles in an approximated spatial distribution obtained for one prior point in time, on the one hand, and changes in location of the individual particles between approximated spatial distributions obtained for at least two prior points in time, on the other hand, are used for providing the estimated spatial distribution of the particles. Providing the estimated spatial distribution of the particles is thus based on the assumption that the particles at least essentially continue their prior trajectories. If they even exactly continue their prior trajectories, and if these trajectories have been completely determined by means of the spatial distributions approximated for the prior points in time, there will be no differences between the virtual two-dimensional images calculated for the provided estimated spatial distribution and the real two-dimensional images recorded for the respective point in time. In other words, differences only occur, if the trajectories of the particles do not continue as they did previously, and any variation of the estimated spatial distribution of the particles necessary for reducing the differences between the virtual and the real two-dimensional images only has to map these variations of the trajectories. Correspondingly, as a rule, the estimated spatial distribution is very close to the actual spatial distribution, and only very few iteration steps are necessary to map still existing differences. Thus, the method according to the invention requires little computing time and is very quick.

It is also to be considered that the method according to the present invention typically is a PTV method in which the shifts of the locations of the particles between the spatial distributions determined for the individual points in time are determined anyway as this is the information of interest in PTV. Thus, the entire information required for providing the estimated spatial distribution of the particles for the next point in time is already existing. Consequently, three-dimensional reconstructions of the spatial distribution from the real two-dimensional images based on triangulation, for example, are often only used in advance of the method according to the invention until the first estimated spatial distribution may be provided on the basis of previously determined spatial distributions.

The method according to the invention is the first PTV method in which the spatial distribution of the particles at at least one point in time is determined based on the distributions of the particles determined for prior points in time in such a way that not even a coarse determination of the spatial locations of the particles at the at least one point in time by means of triangulation or any other three-dimensional reconstruction of the spatial distribution from the real images recorded at the at least one point in time is needed. This is the basis for determining the spatial distribution of the particles at the at least one point in time at a high speed. Nevertheless, a high accuracy in determining the spatial positions or locations of the individual particles is achieved by the method of the present invention.

In the method according to the invention the approximated spatial distribution obtained for a prior point in time which is used for providing the estimated spatial distribution of the particles may be that spatial distribution which has been obtained for the last point in time preceding the at least one point in time. This spatial distribution tends to be that one of the previous spatial distributions which comes closest to the spatial distribution at the at least one point in time. Thus, under suitable circumstances, it may even itself be used as the estimated spatial distribution for the directly following at least one point in time, for example, if it is the only available spatial distribution and if there are no other spatial distributions from which changes of the locations of the individual particles could be determined.

With regard to the changes of the locations of the particles between the spatial distributions approximated for at least two prior points in time, it is preferred if these spatial distributions at least include one of the spatial distributions which have been obtained for the last point in time and the point in time next to the last point in time prior to the at least one point in time. From these two spatial distributions, current information on the velocities of the particles in the interval between the next to last point in time and the last point in time prior to the at least one point in time may be derived. These velocities will only vary to a limited extent between the last point in time and the at least one point in time. Thus, besides the last spatial distribution of the particles, these velocities are the most important information for providing the estimated spatial distribution of the particles for the at least one point in time for which the method according to the invention is currently executed and which, for reasons of simplicity, is also designated as the "current" point in time, here.

In the method according to the invention, the previous trajectories of the particles may also be determined more exactly in that more approximated spatial distributions than those at the last and the next to last point in time prior to the current point in time are considered. Thus, the estimated spatial distribution of the particles for the at least one point in time may be provided in that trajectories of the individual particles are determined from approximated spatial distributions of the particles obtained for at least three prior points in time, and in that these trajectories are extrapolated up to the current point in time.

As the particles continuously continue their previous trajectories when following the flows in a fluid, particles with discontinuous trajectories may be identified and eliminated from the approximated spatial distributions.

Further, the requirement can be placed on the trajectories of the particles that they do not deviate from a Navier-Stokes solution for a flow of a fluid seeded with the particles by more than a given measure. Thus, a Navier-Stokes regularization of the trajectories may be made.

If a particle whose trajectory has been followed over a plurality of previous points in time is missing in real images recorded at one point in time but reappears in the images recorded at later points in time on a continuation of the same trajectory, its location in the spatial distribution determined for the one point in time may be added on the continued trajectory.

Generally, however, particles missing in the real images, when determining the differences between the virtual two-dimensional images and the real two-dimensional images of the same mapping function, may be eliminated from the approximated spatial distribution. If the particles missing in the real images are particles at the border of the estimated spatial distribution, for example, it may be assumed that they have left the respective measurement volume.

Vice versa, additional particles appearing in the real images, when determining the differences between the virtual two-dimensional images and the real two-dimensional images of the same mapping functions, may be added to the estimated spatial distribution, particularly if the additional particles are present at the border of the measurement volume. In this case, it may be assumed that these particles newly got into the measurement volume. The spatial positions or locations of these new particles may be determined from the real two-dimensional images by three-dimensional reconstruction, the effort to be spent for this being limited due to the small number of new particles.

In a particular embodiment of the method according to the invention, the spatial distributions of the particles, for points in time between a first point in time and a much later second point in time, are once determined starting from the first point in time for succeeding points in time and once starting from the second point in time for preceding points in time. In an ideal case, two identical distributions of the particles result for each point in time. For example, with a high density of the particles, this procedure, however, sometimes enables to resolve particles when proceeding in the one temporal direction which are not resolved when proceeding in the other temporal direction. If particles which are only included in one of the two spatial distributions determined for one of the points in time between the first point in time and the second point in time are added to the respective other spatial distribution for this point in time, the other distribution includes all locations of all resolved particles.

If, in the method according to the invention, particles disappear out of the determined spatial distribution, and if afterwards new particles appear in the spatial distribution, they may in fact be the same particles whose trajectories could temporarily not be followed. This particularly applies if the particles do not reappear at the border of the observed volume but, for example, disappear and reappear in a spatial area in which lines of sight of the particles are very close to each other in several images of different mapping functions so that the particles partially or even completely overlap within these images. For checking whether these reappearing particles are in fact the same particles, the presumptive trajectories of the disappearing particles may be extrapolated beyond the point in time of their disappearance by fitting a spline, for example. Then it may be checked whether a particle newly appearing the distribution is located on or close to one of these extrapolated trajectories, and whether its trajectory runs parallel or at least nearly parallel to the extrapolated trajectory. This procedure may also be executed in a reversed temporal direction directed into the past for each newly appearing particle. If the extrapolated and the real trajectories differ by less than a preset threshold value, it may be assumed that the newly appearing particle is in fact the particle which previously disappeared from the distribution. By means of the extrapolated trajectories, the trajectory of such a particle may be completed for those points in time at which the particle was not included in the distribution.

In the method according to the invention, varying the estimated spatial distribution of the particles for reducing the differences between the real and virtual two-dimensional images may include a coordinated variation of the locations particularly of such particles which are closely neighboring to each other in the estimated spatial distribution. Closely neighboring particles in the estimated spatial distribution are also close to each other in the real and virtual two-dimensional images. In case of varying the locations of these particles in the estimated spatial distribution in a non-coordinated way to reduce the differences between the real and virtual images, there is the danger that the location of a particle is varied in such a way that it is consistent with the real images of an in fact different particle. Then, other particles may also no longer be associated correctly. Each mixing up of particles means an error in determining the actual trajectories of the particles. By varying the locations of all particles located in a dense area in a coordinated way, the most probable correct variation of the location of all particles may be more easily acknowledged. Here, various boundary conditions like a minimum mean acceleration of the particles, a minimum mean square deviation from a Navier-Stokes solution for the area and so on may also be set.

Generally, varying the estimated spatial distribution of the particles for reducing the differences between the real and virtual two-dimensional images may include the coordinated variation of the locations of all particles which are included in the estimated spatial distribution of the particles. Then, however, the effort to be spent for the method according to the invention is quite high. Thus, it is suitable to execute the coordinated variation of the estimated spatial distribution of the particles for those particles, only, whose images, due to same or closely neighboring lines of sight completely or at least partially overlap in one, several, nearly all, or even all of the two-dimensional images of the particles. The danger of a relevant overlap of the images of the particles in the images of the different mapping functions particularly exists if only few cameras are used for recording the real images of the particles.

Now referring in greater detail to the drawings, FIG. 1 shows a particle 1 at three succeeding points in time $t_{n-2}$, $t_{n-1}$ and $t_n$ by full dots. Depicted are the positions of the particle 1 in three real images of a same mapping function recorded at the points in time $t_{n-2}$, $t_{n-1}$ and $t_n$. From a plurality of images recorded at different mapping functions at each of the points in time $t_{n-2}$, $t_{n-1}$ and $t_n$, respectively, the location of the particle 1, and with a plurality of particles their spatial distribution, can be determined. In a method according to the invention, this determination is made, generally according to the procedure known from DE 10 2009 009 551 B4 or U.S. Pat. No. 8,542,882 B2 incorporated herein by reference, in that starting from an estimated spatial distribution virtual images are calculated applying the same mapping functions at which the real images of the particles are recorded. Then, the virtual images and the real images of the same mapping functions are compared to determine differences between the positions of the particle in the images. Afterwards, the estimated spatial distribution is varied in such a way that these differences are reduced. These steps may be executed iteratively until differences determined in a next iteration step do not exceed a preset upper threshold or limit value. In the method according to the invention, the estimated distribution of the particles is provided based on the distributions of the particles determined for previous points in time. With regard to the particle 1 depicted in FIG. 1, this means the following: For the point in time $t_n$, an estimated location 2 of the particle 1 is provided based on its last location at the point in time $t_{n-1}$ and further based on its shift 3 between the next point in time $t_{n-2}$ to last point in time $t_{n-1}$ and the last point in time $t_{n-1}$. With equal temporal intervals between the points in time $t_{n-2}$ and $t_{n-1}$ on the one hand and $t_{n-1}$ and $t_n$ on the other hand, it is thus assumed that the shift 4 of the location of the particle 1 between the points in time $t_{n-1}$ and $t_n$ is equal to the shift 3 between the points in time $t_{n-2}$ and $t_{n-1}$. The actual location of the particle 1 at the point in time $t_n$ may differ from this estimated location 2. Any occurring difference 5, however, will only be small. Thus, the approximation of a correspondingly estimated spatial distribution of a plurality of particles 1 to the actual distribution of the particle 1 will be successful in few iteration steps.

Figure 2:
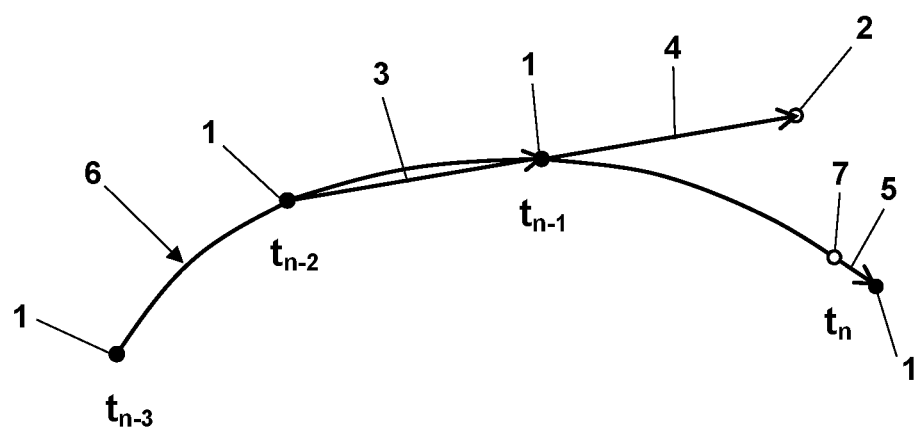
FIG. 2 illustrates the method according to the invention by means of a second embodiment example.
Figure 3:
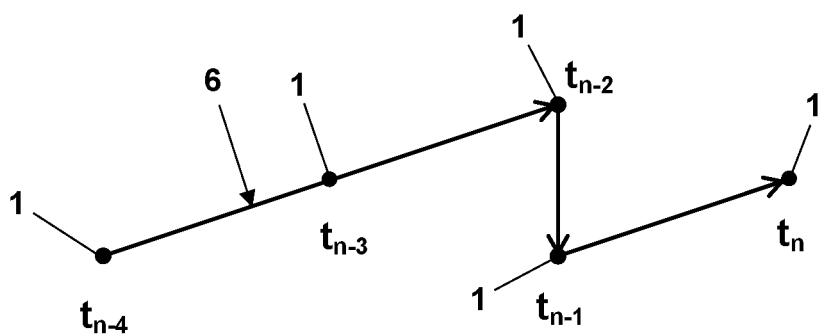
FIG. 3 illustrates a discontinuous trajectory of a particle which—in the method according to the invention—results in elimination of the particle.

FIG. 2 shows a trajectory 6 of the particle 1 in a period of time from $t_{n-3}$ to $t_n$, wherein the particle 1 is depicted at the points in time $t_{n-3}$, $t_{n-2}$, $t_{n-1}$ and $t_n$. In a same way as FIG. 1, FIG. 2 represents a series of two-dimensional images of the particle 1 recorded at a fixed mapping function. The trajectory 6 is curved. Further, the velocity of the particle 1 along the trajectory 6 varies, i.e. the distances covered by the particle 1 between the points in time $t_{n-3}$, $t_{n-2}$, $t_{n-1}$ and $t_n$ following to each other at equal intervals are different. Thus, for determining an estimated location 7 of the particle 1 at the point in time $t_n$, it is suitable to consider as many points in time and the distributions of the particles present at these points in time so that the trajectory 6 may be determined with as many of its properties as possible and extrapolated for the point in time $t_n$. This leads to an estimated location 7 only having a small difference 5 to the real location of the particle 1 at the point in time $t_n$. The extrapolation of the location of the particle 1 for the point in time $t_n$ only on the basis of its location at the point in time $t_{n-1}$ and its shift 3 between the points in time $t_{n-2}$ and $t_{n-1}$, i.e. the assumption of a shift 4 of a same direction and length as the shift 3 corresponding to FIG. 1 would only result in an estimated location 2 for the point in time $t_n$ which is farer away from the actual location at the point in time $t_n$ so that an adaption of the estimated location 7 to the real location of the particle 1 would require much more efforts. FIG. 3 shows a trajectory 6 which may result from the determination of the locations of the particle 1 at five points in time $t_{n-4}$ to $t_n$. This trajectory comprises a discontinuity between the points in time $t_{n-2}$ and $t_{n-1}$ which corresponds to a lateral jump of the particle with regard to its previous and its future moving direction. Due to its inertia and also due to the inertia of the fluid carrying the particle, no real particle may have such a trajectory. In the method according to the invention, such a particle will thus be eliminated.

Figure 4:
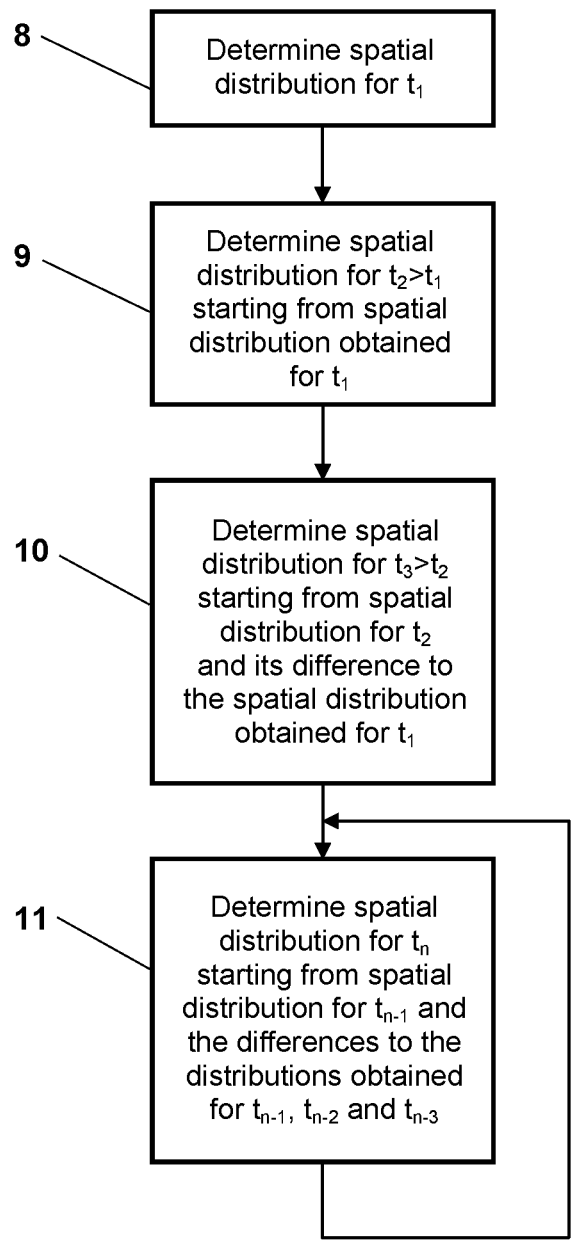
FIG. 4 is a flow chart showing an embodiment of the method according to the invention.

The method according to the invention illustrated in FIG. 4 by means of a flow chart, in a first step 8, starts with a the determination of a spatial distribution of particles for a point in time $t_1$ in any generally known way. In a next step 9, the spatial distribution of the particles is determined in the same way for a point in time $t_2$ following to $t_1$. With a very small interval of time between $t_1$ and $t_2$ and thus with only a small possible variation of the locations of the individual particles, the spatial distribution of the particles for the point in time $t_2$ may alternatively be determined by iteratively adapting the spatial distribution determined for the point in time $t_1$ as an estimated spatial distribution for the point in time $t_2$ to the real images of the distribution. Here, the procedure in iteratively adapting may correspond to the disclosure of DE 10 2009 009 551 B4, corresponding to U.S. Pat. No. 8,542,882 B2 incorporated herein by reference.

For a following point in time $t_3$, in a step 10, the spatial distribution of the particles is also determined starting from an estimated spatial distribution as generally known from DE 10 2009 009 551 B4. As the estimated spatial distribution, however, not only the last spatial distribution determined for the point in time $t_2$ is used, but the estimated spatial distribution for the point in time $t_3$, in addition to the distribution determined for the point in time $t_2$ also considers changes of the locations of the individual particles between the spatial distributions at the points in time $t_1$ and $t_2$ in that it assumes same changes or shifts also between the points in time $t_2$ and $t_3$. For an individual particle, this step 10 corresponds to the procedure which has been illustrated in FIG. 1. In a following step 11, the spatial distribution is then determined for each of later points in time $t_n$ starting from the spatial distribution determined for the point in time $t_{n-1}$ and considering the differences between the spatial distribution determined for the points in time $t_{n-1}$, $t_{n-2}$, $t_{n-3}$ and possibly even further prior points in time. The way in which the estimated spatial distribution is calculated for the point in time $t_n$ considering these prior spatial distributions corresponds to the procedure illustrated in FIG. 2 for one particle 1. The step 11 is then repeated for all further points in time at which real images of the spatial distribution of the particles are recorded.

Figure 5:
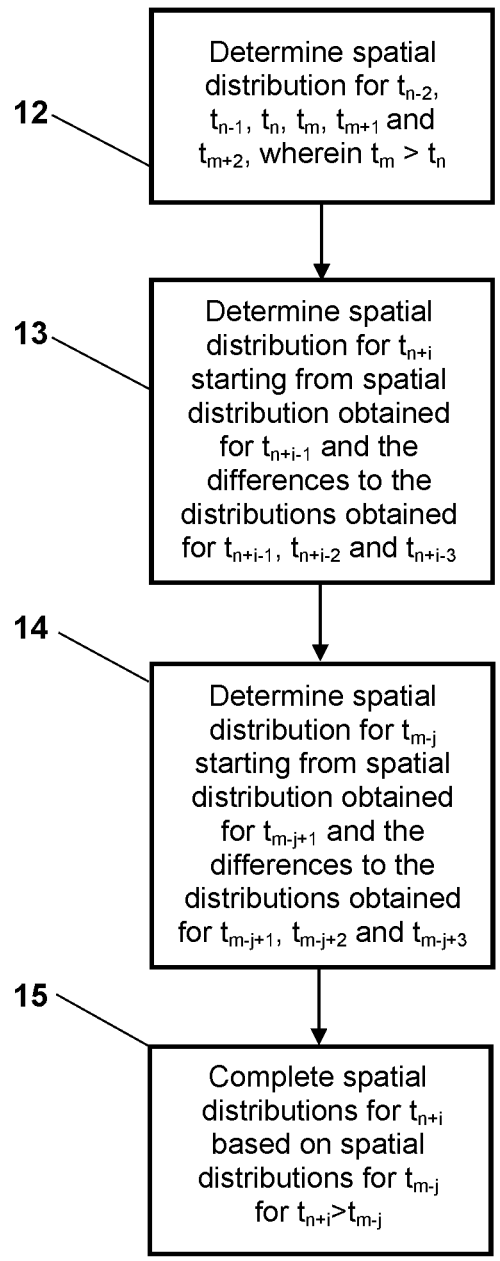
FIG. 5 is a flow chart showing a further embodiment of the method according to the invention.

The method according to the invention illustrated in FIG. 5 by means of a flow chart starts in a step 12 with determining spatial distributions of the particles for three consecutive points in time $t_{n-2}$, $t_{n-1}$ and $t_n$, and $t_m$, $t_{m+1}$ and $t_{m+2}$ up to a first point in time $t_n$ and beginning at a later point in time $t_m$, respectively. Then, in the following steps 13 and 14 the spatial distributions are determined for the points in time $t_{n+i+3}$ or $t_{m-j-3}$ (i,j=0,1, . . . ) remaining between the points in time $t_n$ and $t_m$ based on the spatial distributions for prior points in time $t_{n+i-1}$, $t_{n+i-2}$ and $t_{n-3}$ and later points in time $t_{m-j+1}$ and $t_{m-j+2}$ and $t_{m+3}$, respectively. Here, for each of these points in time, the spatial distribution is once determined preceding in temporal direction and once preceding against the temporal direction. If particles additionally appearing in the spatial distributions which are determined preceding in the one direction are added to the distributions which are approximated preceding in the other direction for the same points in time, completed spatial distributions are achieved for these points in time. Additionally, trajectories of particles which are conspicuous when proceeding in the one temporal direction may be checked by means of the trajectories determined when proceeding in the other temporal direction whether they are in fact continuous trajectories belonging to the same particles or, for example, trajectories of different particles crossing each other at a flat angle.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of determining a changing spatial distribution of particles at multiple points in time following to each other at intervals, the method comprising the following steps for each of the points in time:
   recording real two-dimensional images of the particles with different mapping functions at the respective one of the points in time;
   providing an estimated spatial distribution of the particles;
   calculating virtual two-dimensional images of the estimated spatial distribution applying the different mapping functions;
   determining differences between the virtual two-dimensional images and the real two-dimensional images of the same mapping functions; and
   varying the estimated spatial distribution of the particles for reducing the differences to obtain an approximated spatial distribution which is approximated to the actual spatial distribution of the particles at the respective one of the points in time;
   wherein the estimated spatial distribution of the particles for at least one of the points in time is provided in that the locations of the individual particles in an approximated spatial distribution obtained for one other of the points in time are shifted dependently on how the locations of the individual particles have changed between at least two approximated spatial distributions obtained for at least two others of the points in time.

2. The method of claim 1, wherein the approximated spatial distribution obtained for the one other of the points in time is the spatial distribution which has been obtained for the last one of the points in time prior to the at least one of the points in time or for the next one of the points in time after the at least one of the points in time.

3. The method of claim 1, wherein the approximated spatial distributions obtained for the at least two others of the points time include the spatial distributions obtained for the last one of the points in time and the next to last one of the points in time prior to the at least one of the points in time, or the next one of the points in time and the next to next one of the points in time after the at least one of the points in time.

4. The method of claim 1, wherein the estimated spatial distribution of the particles is provided for at least one of the points in time in that trajectories of the individual particles are determined from the approximated spatial distributions obtained for the at least two others of the points in time and in that these trajectories are extrapolated for the at least one of the points in time.

5. The method of claim 4, wherein the trajectories are determined from the approximated spatial distributions obtained for more than two others of the points in time.

6. The method of claim 5, wherein particles with discontinuous trajectories are identified and eliminated from the estimated spatial distributions.

7. The method of claim 5, wherein particles with trajectories which deviate from Navier-Stokes solutions for a flow of a fluid seeded with the particles by more than a preset limit value are identified and eliminated from the approximated spatial distributions.

8. The method of claim 5, wherein, if a particle whose trajectory has been followed over a plurality of previous ones of the points in time is missing in the real images recorded for the at least one of the points in time but reappears in the real images recorded for later ones of the points in time on a continuation of the same trajectory, a location of the particle on the continuous trajectory is added to the spatial distribution determined for the at least one of the points in time.

9. The method of claim 1, wherein, if particles are missing in the real images when determining the differences between the virtual two-dimensional images and the real two-dimensional images of the same mapping functions, these particles missing in the real images are eliminated from the approximated spatial distribution.

10. The method of claim 1, wherein, if additional particles appear in the real images when determining the differences between the virtual two-dimensional images and the real two-dimensional images of the same mapping functions, these additional particles appearing in the real images are added to the approximated spatial distribution.

11. The method of claim 1, wherein the spatial distributions of the particles for those of the points in time between a first one of the points in time and a much later second one of the points in time are once determined starting from the first one of the points in time for succeeding points in time and once starting from the second one of the points in time for preceding points in time.

12. The method of claim 11, wherein particles which are only included in one of the two approximated spatial distributions obtained for any one of the points in time between the first one of the points in time and the second one of the points in time are added to the other spatial distribution for the respective one of the points in time.

13. The method of claim 1, wherein, in varying the estimated spatial distribution of the particles for reducing the differences, spatial locations of particles which are closely neighboring in the estimated spatial distributions are varied in a coordinated way.

14. A method of determining a changing spatial distribution of particles at multiple points in time following to each other at intervals, the method comprising the following steps for each of the points in time:
  recording real two-dimensional images of the particles with different mapping functions at the respective one of the points in time;
  providing an estimated spatial distribution of the particles;
  calculating virtual two-dimensional images of the estimated spatial distribution applying the different mapping functions;
  determining differences between the virtual two-dimensional images and the real two-dimensional images of the same mapping functions; and
  varying the estimated spatial distribution of the particles for reducing the differences to obtain an approximated spatial distribution which is approximated to the actual spatial distribution of the particles at the respective one of the points in time;
  wherein the estimated spatial distribution of the particles for at least one of the points in time is provided in that the locations of the individual particles in an approximated spatial distribution obtained for one other of the points in time are shifted dependently on how the locations of the individual particles have changed between at least two approximated spatial distributions obtained for at least two others of the points in time;
  wherein the estimated spatial distribution of the particles is provided for at least one of the points in time in that trajectories of the individual particles are determined from the approximated spatial distributions obtained for the at least two others of the points in time and in that these trajectories are extrapolated for the at least one of the points in time;
  wherein the trajectories are determined from the approximated spatial distributions obtained for more than two others of the points in time; and
  wherein particles with trajectories which deviate from Navier-Stokes solutions for a flow of a fluid seeded with the particles by more than a preset limit value are identified and eliminated from the approximated spatial distributions.

15. A method of determining a changing spatial distribution of particles at multiple points in time following to each other at intervals, the method comprising the following steps for each of the points in time:
  recording real two-dimensional images of the particles with different mapping functions at the respective one of the points in time;
  providing an estimated spatial distribution of the particles;
  calculating virtual two-dimensional images of the estimated spatial distribution applying the different mapping functions;
  determining differences between the virtual two-dimensional images and the real two-dimensional images of the same mapping functions; and
  varying the estimated spatial distribution of the particles for reducing the differences to obtain an approximated spatial distribution which is approximated to the actual spatial distribution of the particles at the respective one of the points in time;
  wherein the estimated spatial distribution of the particles for at least one of the points in time is provided in that the locations of the individual particles in an approximated spatial distribution obtained for one other of the points in time are shifted dependently on how the locations of the individual particles have changed between at least two approximated spatial distributions obtained for at least two others of the points in time; and
  wherein the spatial distributions of the particles for those of the points in time between a first one of the points in time and a much later second one of the points in time are once determined starting from the first one of the points in time for succeeding points in time and once starting from the second one of the points in time for preceding points in time.

16. The method of claim 15, wherein particles which are only included in one of the two approximated spatial distributions obtained for any one of the points in time between the first one of the points in time and the second one of the points in time are added to the other spatial distribution for the respective one of the points in time.

17. The method of claim 15,
  wherein the approximated spatial distribution obtained for the one other of the points in time is the spatial distribution which has been obtained for the last one of the points in time prior to the at least one of the points in time or for the next one of the points in time after the at least one of the points in time, and wherein the approximated spatial distributions obtained for the at least two others of the points time include the spatial distributions obtained for the last one of the points in time and the next to last one of the points in time prior to the at least one of the points in time, or the next one of the points in time and the next to next one of the points in time after the at least one of the points in time.

18. The method of claim 15,
wherein the estimated spatial distribution of the particles is provided for at least one of the points in time in that trajectories of the individual particles are determined from the approximated spatial distributions obtained for the at least two others of the points in time and in that these trajectories are extrapolated for the at least one of the points in time, and
wherein the trajectories are determined from the approximated spatial distributions obtained for more than two others of the points in time.

19. The method of claim 18, wherein particles selected from
particles with discontinuous trajectories and
particles with trajectories which deviate from Navier-Stokes solutions for a flow of a fluid seeded with the particles by more than a preset limit value are identified and eliminated from the approximated spatial distributions.

20. The method of claim 18, wherein, if a particle whose trajectory has been followed over a plurality of previous ones of the points in time is missing in the real images recorded for the at least one of the points in time but reappears in the real images recorded for later ones of the points in time on a continuation of the same trajectory, a location of the particle on the continuous trajectory is added to the spatial distribution determined for the at least one of the points in time.

21. The method of claim 15,
wherein, if particles are missing in the real images when determining the differences between the virtual two-dimensional images and the real two-dimensional images of the same mapping functions, these particles missing in the real images are eliminated from the approximated spatial distribution, and
wherein, if additional particles appear in the real images when determining the differences between the virtual two-dimensional images and the real two-dimensional images of the same mapping functions, these additional particles appearing in the real images are added to the approximated spatial distribution.

22. The method of claim 15, wherein, in varying the estimated spatial distribution of the particles for reducing the differences, spatial locations of particles which are closely neighboring in the estimated spatial distributions are varied in a coordinated way.

* * * * *